W. J. ROECKER.
SLEIGH.
APPLICATION FILED MAY 1, 1913.
1,105,536.
Patented July 28, 1914.
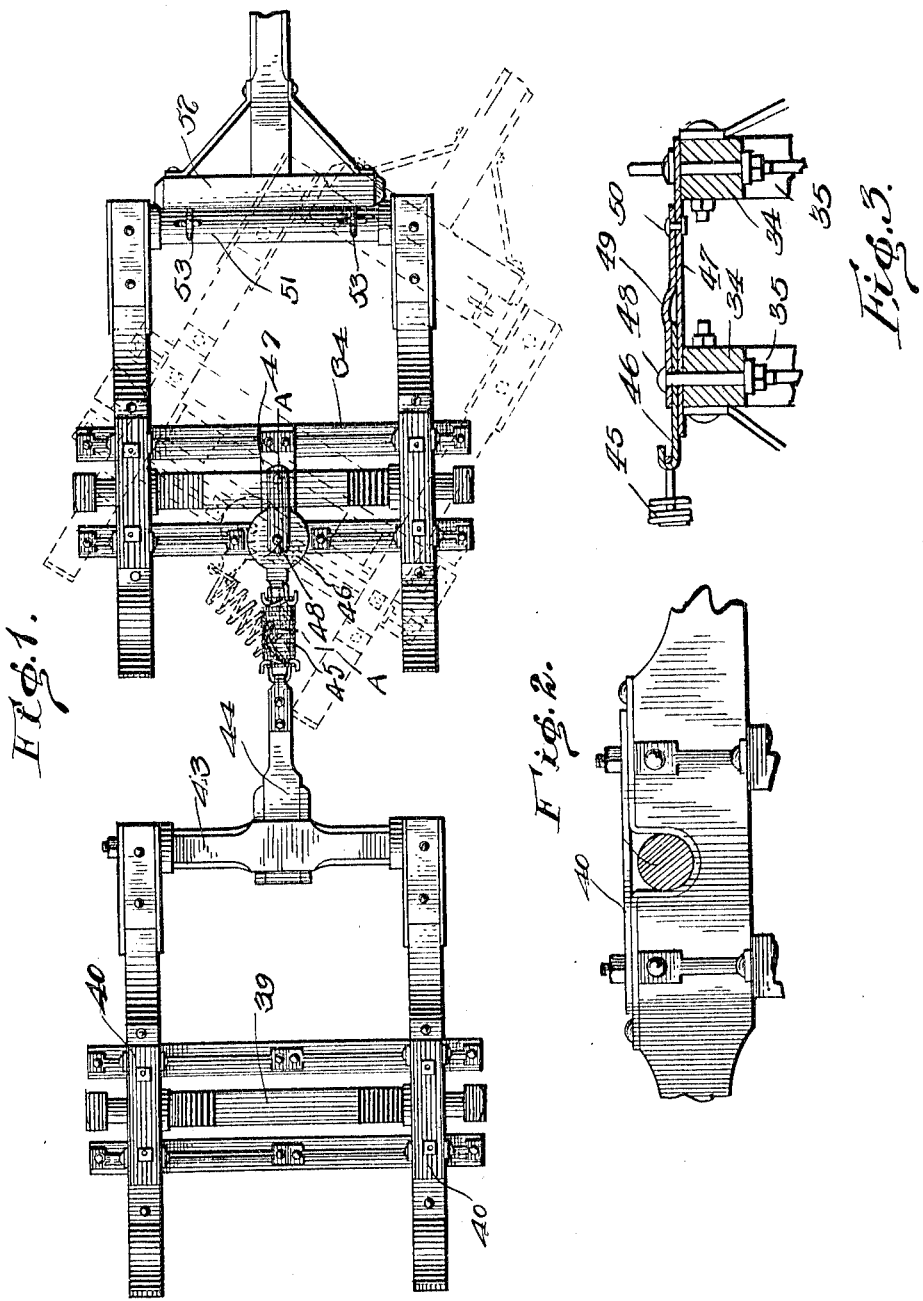
WITNESSES:
Howard F. Costello
Ross J. Woodward
INVENTOR
William J. Roecker
BY
E. E. Yeomans
HIS ATTORNEY

UNITED STATES PATENT OFFICE.

WILLIAM J. ROECKER, OF THREE LAKES, WISCONSIN.

SLEIGH.

1,105,536. Specification of Letters Patent. Patented July 28, 1914.

Application filed May 1, 1913. Serial No. 764,974.

*To all whom it may concern:*

Be it known that I, WILLIAM J. ROECKER, a citizen of the United States, residing at Three Lakes, in the county of Oneida and State of Wisconsin, have invented certain new and useful Improvements in Sleighs, of which the following is a specification, reference being had therein to the accompanying drawing.

This invention relates to a sled and the principal object of the invention is to provide the forward and rear sleds with an improved connecting means.

Another object of the invention is to provide a new type of sled constructed so that it will be very strong and will not be liable to break or collapse.

With these and other objects in view, this invention consists of certain novel combinations, constructions and arrangements of parts as will be hereinafter fully described and claimed.

In the accompanying drawings: Figure 1 is a top plan view of the sled runners. Fig. 2 is an enlarged fragmentary sectional view showing the manner in which the axles are attached to the sled runners. Fig. 3 is a fragmentary sectional view taken on line A—A of Fig. 1.

By the construction shown in Fig. 1 the sleds will be pivotally connected with the frame, thereby permitting the sleds to follow the unevenness in the road without the frame being tilted. The rocker beam 43 is pivotally mounted between the runners of the rear sled and is provided with a short tongue 44 to which one end of the springs 45 is pivotally connected. A disk 46 is pivotally connected with a plate 47 connecting cross-bars 34 to the forward sled and is held in place by a bolt 48 which passes through a shorter plate 49 secured to the plate 47 by the rivet 50. The forward sled is also provided with a rocker beam 51 to which the draft tongue 52 is pivotally connected by the eyes 53.

When it is desired to convey the sled from one place to another, the draft animals are connected to the tongue 52 and the sled is drawn along the road. The spring 45 can expand and this will permit the turn to be easily made since there is no rigid reach pole to interfere with the turning of the forward sled. It will also be noted that the rocker shaft 43 permits the forward and rear sleds to tilt in opposite directions without interfering with their independent pivotal movement. It will also be noted that when it is desired, the plates 40 can be easily removed, and wheels placed upon the axles instead of sleds.

As is illustrated in Fig. 1 the front sled is shown in a dotted position turned at an angle to the rear sled.

Having thus described the invention, what is claimed as new, is:

A device of the class described comprising a forward sled, a rear sled, said rear sled provided with a forwardly extending tongue, said forward sled provided with a plurality of transversely extending members, a bridge plate connecting said transversely extending members, a rotating plate pivotally mounted upon one of said transversely extending members, said rotating plate provided with a rearwardly extending tongue, and a coil spring connecting said forward tongue of said rear truck and said rearwardly extending tongue of said forward truck for constituting an expansible and yieldable connection between said rearward and forward trucks for permitting the independent swinging of said forward truck relative to said rearward truck.

In testimony whereof I hereunto affix my signature in presence of two witnesses.

WILLIAM J. ROECKER.

Witnesses:
WM. J. NEU,
AUGUST TOELLE.

Copies of this patent may be obtained for five cents each, by addressing the " Commissioner of Patents, Washington, D. C."